United States Patent [19]
James et al.
[11] 3,758,716
[45] Sept. 11, 1973

[54] TELEVISION RECEIVER MOUNTING APPARATUS

[75] Inventors: Donald N. James; Peter A. Nightingale, both of Boulder, Colo.

[73] Assignee: Ball Brothers Research Corporation, Boulder, Colo.

[22] Filed: Aug. 2, 1971

[21] Appl. No.: 168,377

Related U.S. Application Data

[63] Continuation of Ser. No. 780,500, Dec. 2, 1908, abandoned.

[52] U.S. Cl. ............ 178/7.8, 178/7.9, 317/101 CB, 339/17 F
[51] Int. Cl. ............ H04n 5/645
[58] Field of Search ............ 178/7.8, 7.82, 7.9; 317/101 CB, 101 DH; 339/17 F, 176 MF

[56] References Cited

UNITED STATES PATENTS 3,614,519 10/1971 Figlewicz et al. .................. 178/7.82

*Primary Examiner*—Robert I. Griffin
*Assistant Examiner*—Joseph A. Orsino, Jr
*Attorney*—Campbell, Harris & O'Rourke

[57] ABSTRACT

Television receiver mounting apparatus particularly adapted for mounting in broadcasting studio racks, the apparatus having a rigid metallic frame and a chassis extending rearwardly from the frame. The frame has four rearwardly extending protrusions between which the enlarged end of the kinescope is received at an opening in the frame in proper position for viewing. Cushioned brackets are secured between the frame protrusions and the kinescope to frictionally restrain the kinescope from movement and to maintain it in a fixed horizontal and vertical position. A second opening horizontally spaced from the first opening receives both externally mounted controls and readily accessible internally mounted controls - the latter being accessible by means of a movable circuit card slidable along a guide forwardly from the front of the receiver without disruption of normal receiver operation. The circuit card may also be disconnected and removed from the receiver through the second opening.

6 Claims, 13 Drawing Figures

INVENTORS
DONALD N. JAMES
BY PETER A. NIGHTINGALE
Campbell, Harris & O'Rourke
ATTORNEYS INVENTORS
DONALD N. JAMES
PETER A. NIGHTINGALE
BY
Campbell, Harris & O'Rourke
ATTORNEYS INVENTORS
DONALD N. JAMES
PETER A. NIGHTINGALE
BY
Campbell, Harris & O'Rourke
ATTORNEYS INVENTORS
DONALD N. JAMES
PETER A. NIGHTINGALE
BY
Campbell, Harris & O'Rourke
ATTORNEYS

TELEVISION RECEIVER MOUNTING APPARATUS

This application is a continuation of copending U. S. application Ser. No. 780,500, filed Dec. 2, 1968, now abandoned, entitled "Television Receiver Mounting Apparatus."

BACKGROUND OF THE INVENTION

1. Field of the Invention

This invention relates to a television receiver and more particularly to an improved mounting structure for a television monitor.

2. Description of the Prior Art

Concurrent use of a number of television monitors has been found to be desirable, and, in some cases, necessary in many situations, such as, for example, in television broadcasting studios where numerous monitors are needed to depict scenes from multiple camera locations. The monitors are mounted in racks to accommodate both horizontal and vertical arrangements. A popular increment in racks presently used in many studios measures 10½ inches high by 19 inches wide and 18 inches deep.

It is always a design criteria to utilize as much as possible of the available area at the front of the rack with the viewing screen and to minimize space consumption by the associated mounting apparatus and controls. Further, it is desirable to position the monitors close to each other so that a studio engineer may view many monitors from a single location. Since the monitors are of a high performance type, there are various controls for both fine and coarse picture regulation. These controls must, of course, be readily accessible to the engineer for adjustments, maintenance, and the like, without having to remove the monitor from the rack. Positioning most of the controls on the front of the monitor conflicts with the hereinbefore-mentioned design objective of utilizing the available front rack area with a large viewing screen.

Heretofore, prior art television receiver mounting apparatus has often included at least the following: (a) those having the various controls positioned around the periphery of the kinescope; for example, vertically on one or both sides and horizontally either above or below the kinescope; and (b) those having the most frequently used controls alongside the kinescope but having the numerous other and less important controls in inaccessible positions within the case. In the former instance noted, the peripherally mounted controls occupied too much of the available rack space which in turn unduly limits either the number of monitors or the size of the kinescope viewing screens. In the latter instance of situation (b) above, rack space is conserved at the sacrifice of control accessibility.

While it has been suggested, in order to obviate the accessibility problem, that portions of the controls and components of the monitor could be removed and made accessible without removing the entire monitor, the problem has not been completely solved since the monitor is normally rendered inoperable upon such removal.

Further, the prior art devices usually did not have a kinescope support frame but instead the kinescope was positioned relative to a base by resilient supports or by a tight band strapped around the periphery of the enlarged end of the tube and attached to the base. The resilient supports usually engaged the tube at positions on the bulbous portion rearward of the screen; however, the bulbous portions of most tubes are relatively weak and shock sensitive. Nor was the band and the associated tightening means which usually accompanied the band satisfactory since these elements occupied not a negligible portion of available rack space thereby further limiting the size of the kinescope screen. Also, in order to shadow the viewing screen a bezel was often necessary and positioned about the perimeter of the screen. The bezels, however, were not utilized to support the screen and were usually relatively weak. Further, utilization of the separate bezels usually placed another limitation on the size of the screen which could be used in the available rack space.

SUMMARY OF THE INVENTION

The present invention solves the aforenoted problems of the prior art and provides television receiver apparatus having a rigid frame for supporting the kinescope in viewing position and a slidable circuit card which is received within the frame and is normally positioned behind the same but which may be moved forwardly without electrically disconnecting the circuit card from stationary electrical components of the receiver. With the support frame and sliding circuit card arrangement of the invention, a larger kinescope screen may be utilized in available studio racks than heretofore possible while yet providing the advantages of accessibility to electrical components and controls of the monitor without necessitating cessation of monitor operation.

It is accordingly an object of the present invention to provide a novel television receiver mounting apparatus having a rigid frame for supporting a kinescope in a fixed position.

Another object of the invention is to provide a rigid frame having protrusions to receive the enlarged end of a kinescope and utilized to position the kinescope.

It is a further object of the invention to support the kinescope of a television receiver solely by frictional restraint at the enlarged end thereof.

A further object of the invention is to provide a television receiver support frame which shadows a portion of the kinescope viewing screen so as to obviate the necessity of a special visor and the like.

It is also an object of the invention to provide, in a television receiver, an electrical component mounting apparatus which may be moved without disconnecting the components thereon.

It is a further object of the present invention to provide, in a television receiver, a circuit card for mounting electrical components including controls, and the like, which circuit card may be readily withdrawn from the front of the receiver for access to the various components in order to permit maintenance and adjustments without disrupting receiver operation.

A further object of the invention is to provide, in a television receiver, a readily extendable and retractable circuit card mounted on a slide guide which is supported by a rigid kinescope frame and a chassis.

A further object of the invention is to minimize the front space required to mount the kinescope of a television receiver relative to associated electrical controls while yet permitting access to the electrical controls from the front of the receiver.

Still further, it is an object of the invention to provide, in a television monitor, a frame and chassis adapted to fit within a rack, which frame efficiently utilizes the available front space of the rack so as to permit a relatively large kinescope screen to be used in the monitor without sacrificing the advantages of readily accessible monitor controls and associated electronics.

Further, it is an object of the present invention to obtain a high ratio of kinescope screen area to the frontal area of a precision television monitor adapted to be mounted in studio racks.

With these and other objects in view which will become apparent to those skilled in the art as the description proceeds, this invention is encompassed in the novel apparatus and arrangement of parts substantially as hereinafter described and more particularly defined by the appended claims, it being realized, however, that changes in the precise embodiment of the invention herein are meant to be included as come within the scope of the claims.

DESCRIPTION OF THE PREFERRED EMBODIMENT

Figure 1:
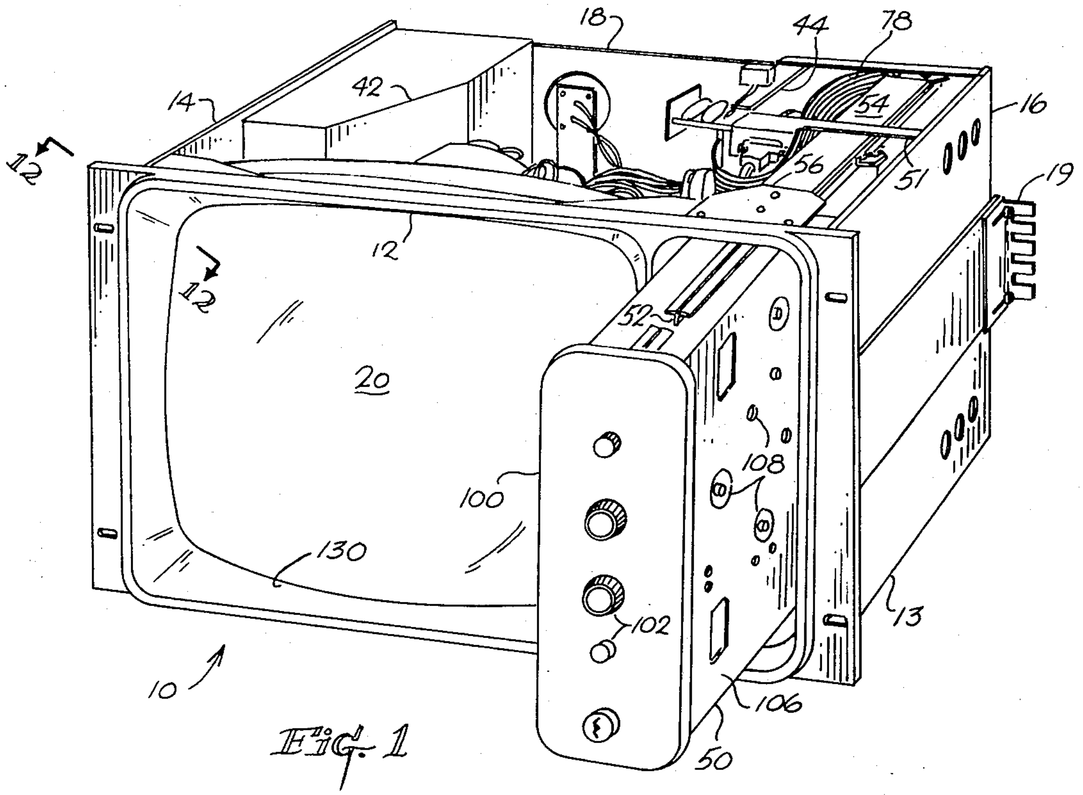
FIG. 1 is a perspective view of the monitor with the circuit card in a partially extended position.
Figure 2:
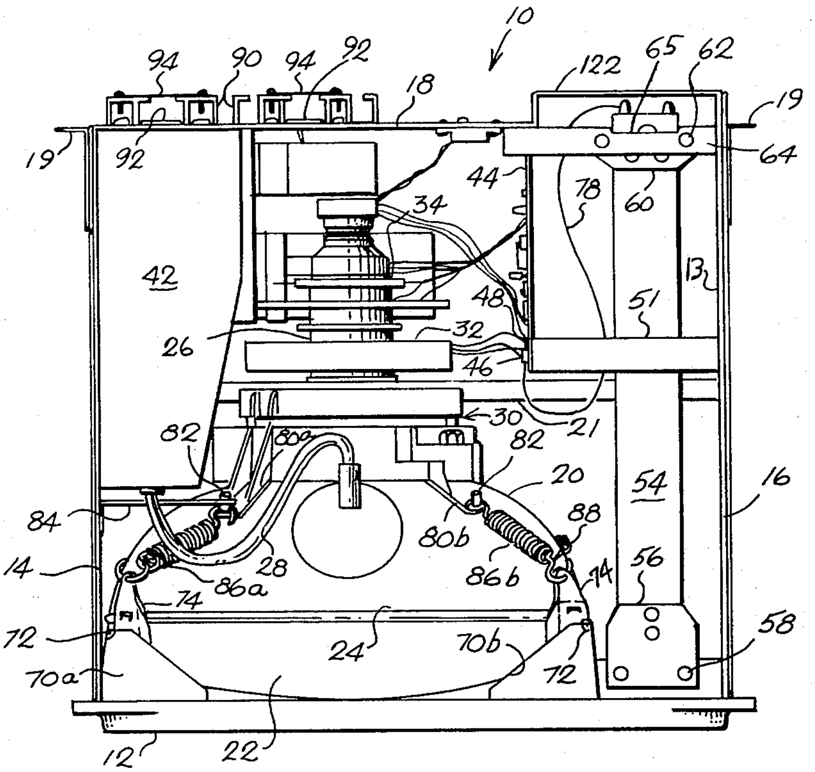
FIG. 2 is a top plan view of the monitor of FIG. 1 with the circuit card in normal position locked within the monitor chassis.

Referring to FIGS. 1 and 2, a monitor 10 is shown which includes a rigid frame 12, preferably of cast metal, and an attached chassis 13, having sidewalls 14 and 16, and rear wall 18. One of a pair of rack guides 19 is mounted to each of the sidewalls 14 and 16. A bar 21 is attached to and extends between the bottom portions of sidewalls 14 and 16 to aid the chassis rigidity. Associated electrical components of the monitor are shown generally within the frame and chassis. These include a kinescope or picture tube 20 having a thick faceplate 22, bulbous portion 24, and a narrow neck portion 26, an anode lead 28, a deflection yoke assembly 30 circumferentially positioned about the neck portion 26 of tube 20 where it meets the widened bulbous portion 24, a convergence assembly 32, and clamped purity rings 34. Other associated electrical components are contained within a high voltage section 42, are mounted to a stationary circuit card 44, to the chassis rear wall 18, and to a movable circuit card assembly 50 hereinafter particularly described with reference to FIG. 3.

A support bar 51 is attached to and extends between sidewall 16 and the circuit board 44 to lend support at the forward end of the circuit board.

A runner 52 is attached to the circuit card assembly 50 and fits within a slide guide 54 which is mounted to the frame 12 by a hexagonal plate 56 held by screws 58, and to the rear wall 18 by a small hexagonal plate 60 secured by screws 62 to an L-shaped bracket 64. The bracket 64 is cut away at a midsection 65 to accommodate the guide 54.

The frame 12 hereinafter more fully described with reference to FIGS. 7 through 10 has four rearwardly extending protrusions or corners 70 for receiving picture tube 20. Each has triangular faces in both the horizontal and vertical planes. A hole 72 is bored in each protrusion 70 at an angle from both the planes of the triangular portions of respective protrusions so that each hole is disposed toward the central portion of the faceplate 22 of the picture tube 20.

Figures 7, 12:
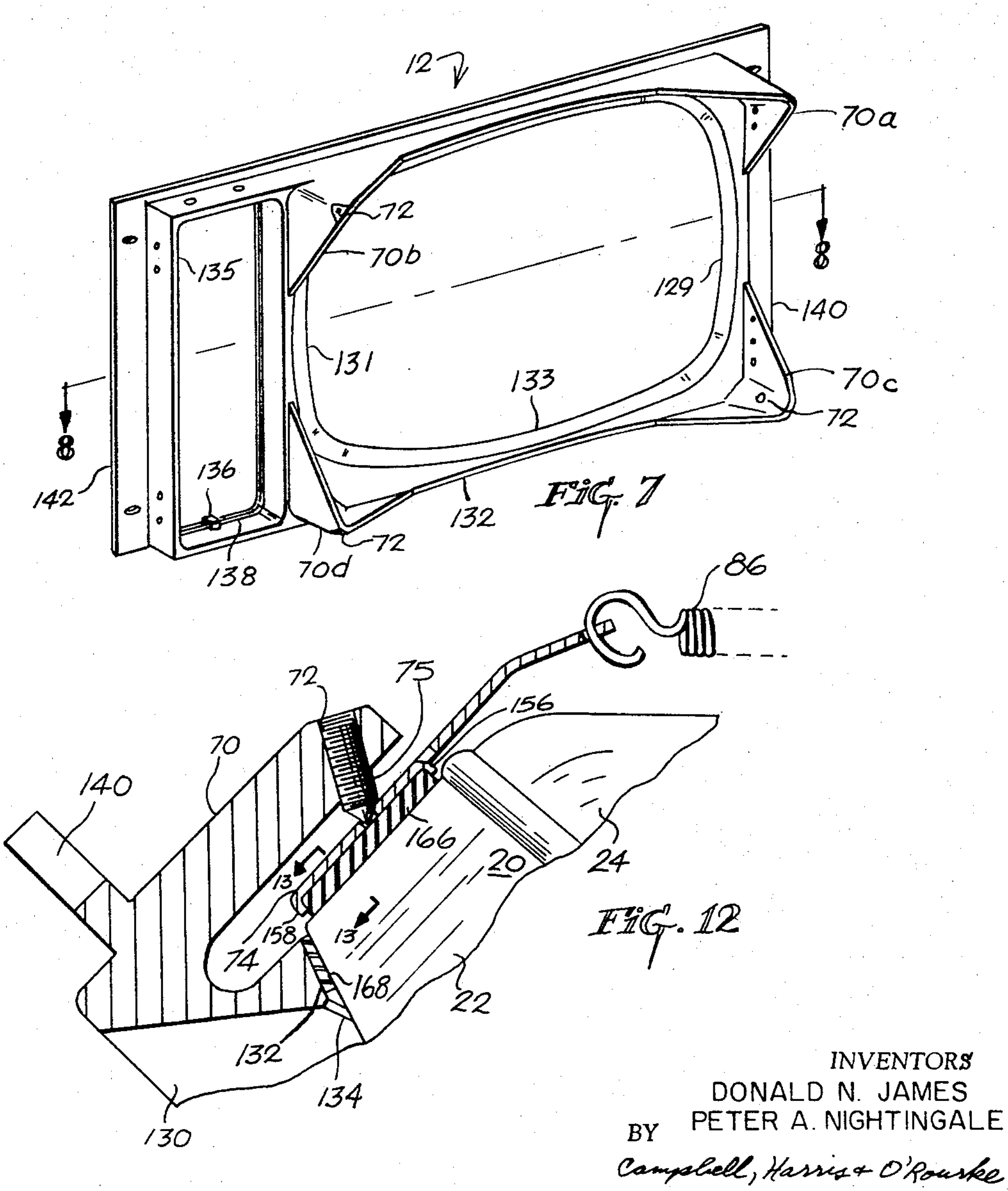
FIG. 7 is a perspective rear view of the kinescope frame.
FIG. 12 is a partial cross-sectional view taken along the lines 12—12 of FIG. 1.

A recessed screw 75, as shown in FIG. 12, is inserted in each of the holes 72 to secure respective brackets 74, hereinafter particularly described with reference to FIG. 11. The frame 12 is the sole support of the tube 20 so as to avoid the necessity of a space consuming base mounting arrangement. Further, the absence of a base mounting arrangement permits access from below the monitor 10 which is of particular advantage when the monitor is placed in a high rack such as found in commercial studios.

In FIG. 2, the circuit card 50 is not visible since it is retracted to the normal position on guide 54. Electrical connections to the various components, including controls, on the circuit card 50 are made by flat conductors embedded in a flexible, thin, insulating sheet 78 of a material such as plastic. As a safety precaution, however, the power line to the card 50 may be separate and connected from board 44 to a plug (not shown) on card assembly 50 with reasonable conductor length being utilized to allow the card assembly 50 to be withdrawn to the extended, or displaced position. The flexible sheet 78 may be secured to the stationary circuit board 44 by a rectangular block 46 screwed to the board and by an adhesive at the end portion 48 of the sheet. The conductors on board 44 may then be soldered directly to the respective conductors on the flexible sheet 78.

The deflection yoke assembly 30 has an encompassing holder including four arms 80, two of which are indicated at **80*a* and 80*b*, and two others in similar positions below the kinescope 20, each arm having a respective cylindrical projection 82. The yoke assembly 30 is held in position by a single bracket 84 secured at one end to the sidewall 14 of the chassis. At the other end, the single bracket has a hole to receive the projection 82 in a grommet. The yoke assembly 30 is additionally supported, and finely positioned both horizontally and vertically by a set of four springs 86, two of which are indicated at 86*a* and 86*b*, and two others in similar positions below the kinescope 20, each spring of which is connected between one of the brackets 74 and to respective projections 82 of arms 80. A spring 88 is connected to spring 86*b* and to the similarly positioned spring at the bottom portion of the tube 20 and serves as a ground safety connection to the outside of bulbous portion 24** which is normally coated with a metallic film.

Heat sinks 90 are attached to rear wall 18 about electrical components that require heat dissipation for optimum operation; for instance, some power transistors. Accordingly, transistors 92 are shown mounted within the respective heat sinks 90. Plates 94 are secured to the heat sink to protect the transistors and to further dissipate the generated heat.

Figure 3:
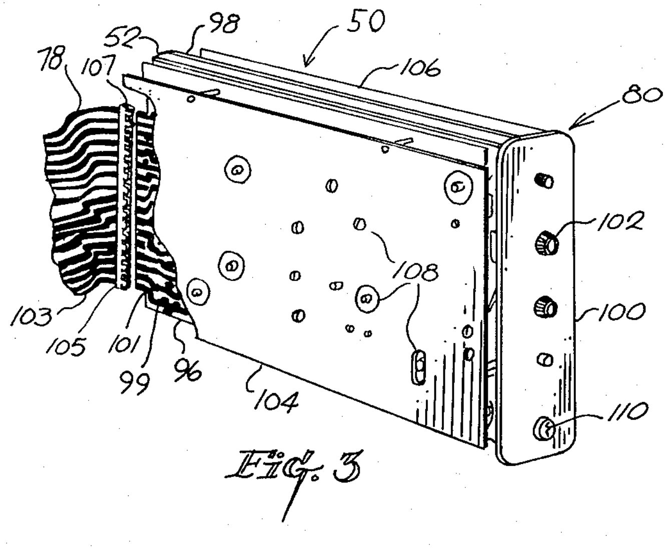
FIG. 3 is a perspective view of the circuit card removed from the monitor frame and chassis.

The circuit card assembly 50 is easily removable from within the chassis of monitor 10 and is shown removed in FIG. 3. The runner 52 is secured to a pair of spaced, back-to-back circuit boards 96 and 98. A panel 100 is mounted at the front edge of the circuit boards 96 and 98. Crucial and most frequently used controls 102, such as power, brightness and contrast controls, protrude through the panel upon which may be written the appropriate index. A pair of faceplates 104 and 106 are secured to and spaced from circuit boards 96 and 98, respectively. Faceplate 104 is shown, in FIG. 3, broken away at the rearward portion of circuit card assembly 50 so as to illustrate the shape of circuit board 96 having conductors 99 terminating at a neck portion 101.

The aforementioned flexible sheet 78 having rows of conductors 103 is attached to a connector 105. As shown in FIG. 3, sheet 78 is broken away toward one end leading to its stationary attachment to circuit board 44. The connector 105 includes flexible lugs 107, each of which is connected to one of the conductors 103 in the flexible sheet 78, and the number of lugs 107 of which would normally correspond to the number of conductors 103 in the sheet 78. The connector 105 fits onto the edge of the neck portion 101 so that each of the flexible lugs 107 engages one of the conductors 99 so as to complete the various electrical connections between stationary circuit board 44 and the movable circuit card 50. It will be obvious that a connector such as connector 105 might also be utilized to connect the conductors of sheet 78 to the stationary circuit board 44 in lieu of utilizing the permanent connector block 46 already mentioned.

The faceplates 104 and 106 have appropriate holes and slots for access to various controls 108 positioned on the circuit boards, some of which controls may be adjusted or manipulated by hand and others by utilization of a small tool. These controls 108, in a color monitor built in accordance with the invention for commercial studio use, include the controls for chroma, hue, green gain, blue gain, red screen, green screen, blue screen, red on-off, green on-off, blue on-off, chroma pre-set, horizontal hold, vertical hold, vertical size, vertical centering, horizontal centering, horizontal size, focus, vertical linearity, aperture corrections, convergence controls and others. An index or name to each control may be written upon the face-plates 104 and 106 with appropriate adjustment and instruction notations. In order to prevent tampering of the controls 108, a lock 110, released only by use of an appropriate key (not shown) is provided in panel 100 so that the entire circuit card assembly 50 may be locked within the chassis 13 of the monitor 10.

Figures 4, 5, 13:
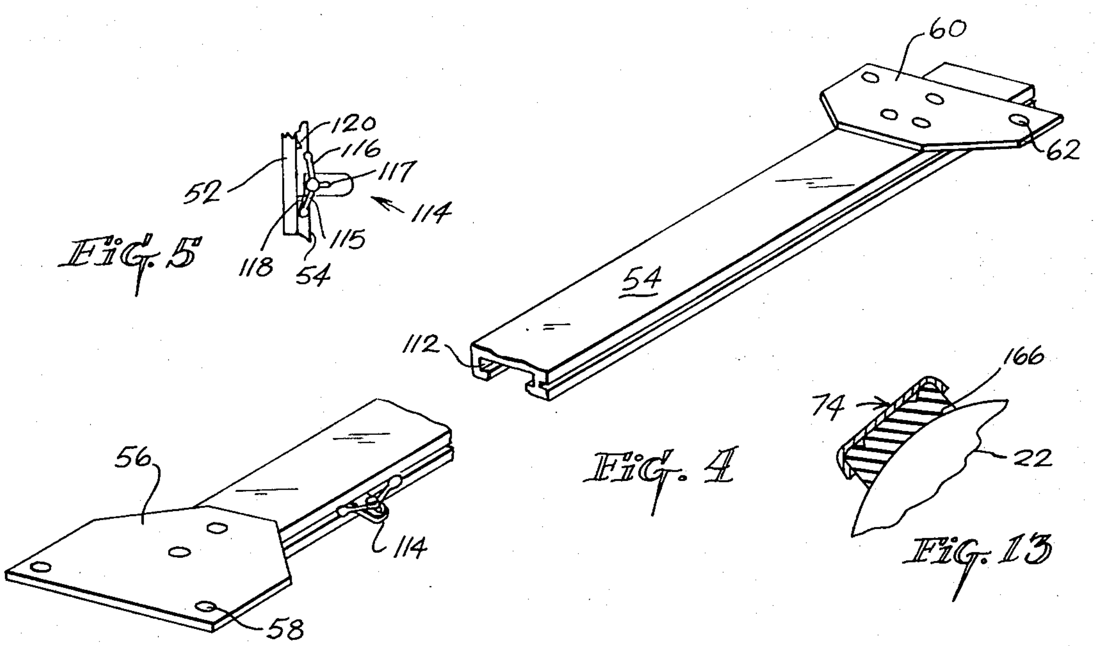
FIG. 4 is a broken-away, perspective view of the monitor slide guide for receiving and supporting the circuit card.
FIG. 5 is a broken-away top plan view of restraining means or stop 114 of FIG. 4.
FIG. 13 is a partial cross-sectional view taken along the lines 13—13 of FIG. 12.

In FIG. 4, the slide guide 54 is shown with the attached hexagonal plates 56 and 60 provided so that the guide may be secured to the frame 12 and bracket 64, respectively. The guide is turned inwardly at the bottom so as to form a slot 112 for receiving the runner 52 on the circuit card assembly 50. A stop 114, shown enlarged in FIG. 5, is attached to the guide 54 and is provided to prevent the circuit card assembly 50 from being accidentally withdrawn therefrom. The stop has a pivotal member 116 in a slot 117 with the forward end of the member 116 being biased outwardly by a spring in slot 117. Runner 52 is provided with projections 118 and 120. Upon the forward end of member 116 engaging the projection 118 the rearward end is pivoted into engagement with projection 120 so as to prevent further forward movement of the circuit card assembly 50. Releasing the member 116 by moving the pivot in slot 117 slightly away from the guide 54 permits the circuit card assembly 50 to be removed entirely. It should be readily apparent that there are many forms of suitable guides, such as slide guide 54, and runners, such as runner 52, that may be used to accomplish the same function of enabling the circuit card assembly 50 to be first stopped before being completely withdrawn on the guide and removed from within the chassis 13 of the monitor 10.

Figure 6:
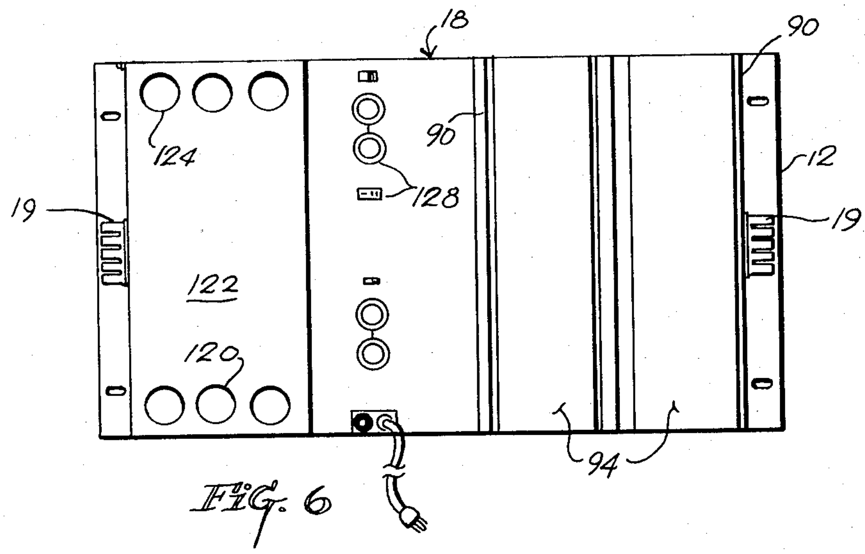
FIG. 6 is a rear view of the monitor.

As shown in FIG. 6, the rear wall 18 of the monitor 10 includes a rearwardly projecting portion 122 having holes 124 to permit increased air circulation. Additional electrical components, such as infrequently used controls 128, may be mounted on the midsection of the rear wall 18. The heat sinks 90 and protective plates 94 extend substantially the total height of the rear wall 18.

Figure 8:
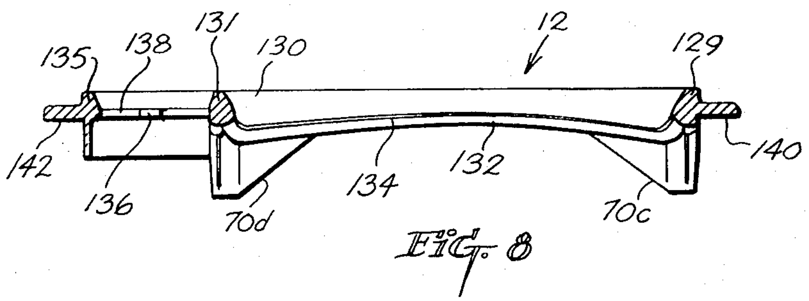
FIG. 8 is a cross-sectional view of the kinescope frame taken along the lines 8—8 of FIG. 7.

As particularly shown in FIGS. 7 and 8, the frame 12 defines an opening between sides 129 and 131 and includes the shadow mask portion 130 having an inner periphery 133 adapted to the contour of the front of the picture tube 20. An integrally formed portion 132 extends rearwardly from an interface or land 134 adjacent the mask portion 130.

The frame defines another opening between side 131 and a side 135 for receiving the circuit car assembly 50. A lock stub 136 is attached to a land 138 to as to engage in conventional manner the operative means (not shown) of the lock 110 mounted on the panel 100 of the circuit card assembly 50. The generally flat projections 140 and 142 extending from sides 129 and 135, respectively, permit the monitor to be permanently secured to a studio rack or the like.

Figures 9, 10:
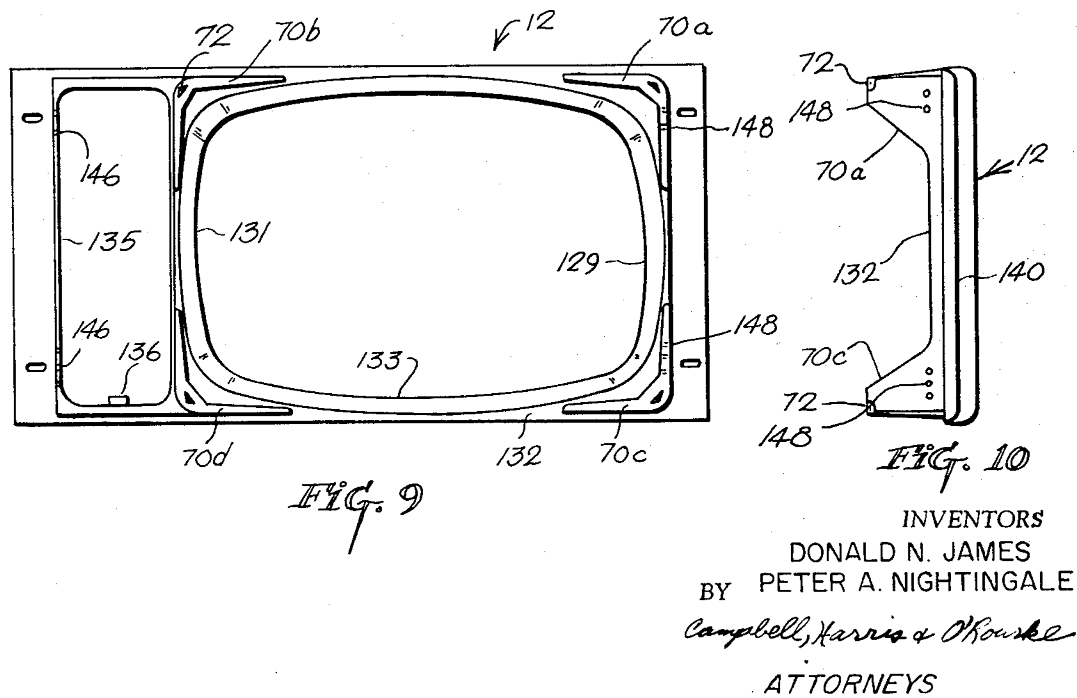
FIG. 9 is a rear view of the kinescope frame shown in FIG. 7.
FIG. 10 is a right side view of the frame of FIG. 7.

The rear view of the frame 12 is shown in FIG. 9 which particularly illustrates the details of the integral protrusions or corners, 70, provided to receive the picture tube 20 which fits adjacent to the peripheral shadow mask portion 130. Holes 72 extend toward the central portion of the frame 12. Holes 146 in the side 135 and holes 148 in protrusions **70*a* and 70*c* permit the attachment of the sidewalls 16 and 14, respectively, to the frame 12. The side view of FIG. 9 is shown in FIG. 10 to again illustrate the details of the protrusions, the protrusions 70*a* and 70*c* of which are shown. The protrusions are slightly tapered from the portion 132 toward respective openings or holes, 72.**

Figure 11:
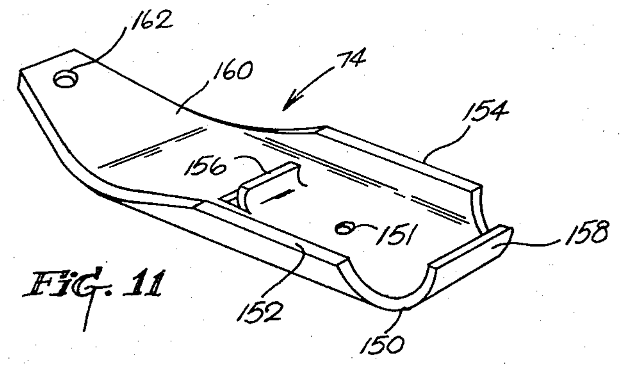
FIG. 11 is a perspective view of the kinescope restraining bracket.

Referring to FIG. 11, a perspective view of one of the kinescope brackets 74 is shown and includes a body portion 150 having a hole 151 centrally located in a recess formed by opposite parallel walls 152 and 154, and a tongue 156 opposite a lip 158. The body includes a neck portion 160, slightly curved in the direction of the tongue 156, having a hole 162 so that one of the springs 86 may be attached thereto. The bracket recess receives a cushion 166 of rubber or other suitable material as shown in FIGS. 12 and 13. The cushion 166 is of a thickness greater than the height of the recess formed by walls 152 and 154, tongue 156, and lip 158.

Each of the brackets 74 is secured in fixed position by screws, such as the screw 75, inserted into each of the holes 72 of the respective protrusions 70 so as to engage each bracket 74 within the small hole 151. Each screw 75 is disposed toward the central portion of the frame 12 and tightly engages the respective bracket 74 until the pressure flattens the cushion 166 against the abutting and rounded contour of the picture tube 20. In this manner the picture tube 20 is frictionally restrained at the corner of the tube from either horizontal or vertical movement by the four cushions, one in each recess of the brackets 74. Cushions 166 also effectively lessen the various shocks to the tube 20 incurred upon movement of the monitor 10. Further, a cushion ring 168 is also provided between the periphery of the faceplate 22 and the rearwardly extending frame portion 132.

The protrusions 70 sufficiently support and restrain the tube without the use of any additional means at the rear of the bulbous portion 24 or at the neck 26. The brackets 74 being firmly positioned relative to the respective protrusions 70, also maintain the yoke assembly 30 in the finely adjusted position maintained in accordance with the length and tension of the springs 86 attached to the brackets.

Although only one embodiment of the invention has been shown and described, various modifications as may appear to those skilled in the art are intended to be within the contemplation of the invention as described in scope by the claims.

What is claimed is:

1. In a television receiver apparatus, a rigid support frame defining a first substantially rectangular opening for exposure of the viewing screen of the picture tube of said receiver apparatus, and defining a second opening adjacent the first opening, said frame having a plurality of corner protrusions for receiving the corners of the enlarged substantially rectangular end of the picture tube; adjustable bracket means having a portion between said corner protrusions and said corners of the enlarged end of said picture tube; cushioning means to abut the corners of the enlarged end of the picture tube and positioned between the corners of the enlarged end and said adjustable bracket means whereby the picture tube may be frictionally restrained by said cushioning means in a fixed position in the protrusions of said support frame with minimum space utilization; movable electrical component mounting means adapted to be received through the second opening of said rigid frame; chassis means extending rearwardly of said rigid support frame; and means for enabling said movable component mounting means to be moved from a normal position within said chassis means to a displaced position forwardly of said rigid frame without disruption of electrical connections of the receiver.

2. In the television receiver apparatus as defined in claim 1, the protrusions of said frame having holes disposed toward the first opening; and the adjustable bracket means being screw-threadedly engaged within said holes so that force components exerted upon the corners of the picture tube relative to said frame and through said cushion elements urge the tube toward the periphery of the frame adjacent the first opening.

3. In a television-receiver apparatus, a rigid support frame having a plurality of integral protrusions shaped for receiving the corners of the substantially rectangularly shaped enlarged end of the picture tube of the receiver apparatus, said frame defining a first opening for exposure of the viewing screen of the picture tube, the protrusions of said frame having holes disposed toward the central portion of the first opening, and said frame defining a second opening adjacent the first opening; a pair of side panels attached to said frame and extending rearwardly along the picture tube; a rear panel connected between said pair of side panels; bracket means between the protrusions of said frame and the corners of said picture tube; cushion elements positioned between said bracket means and the corners of said picture tube; means extending from within the holes in the protrusions of said frame for securing said bracket means; a movable circuit board for mounting electrical components of the receiver apparatus and adapted to be received through the second opening of said frame; guide means for supporting said circuit board and having a first member in stationary position relative to said frame and a second member on said movable circuit board, the first and second members of said guide means adapted to mate with each other; and flexible conductor means for electrically connecting stationary components of the receiver apparatus, including the picture tube, with a portion of the components of said movable circuit board whereby the picture tube may be maintained in fixed position within the integral protrusions of said frame with a minimum of space utilization and said circuit board may be easily withdrawn through the second opening in said frame to permit adjustment and maintenance to the components on said circuit board without electrically disconnecting the components.

4. Apparatus for supporting a cathode ray tube and associated electrical components, the apparatus comprising:

a rigid frame having a plurality of integral protrusions shaped for receiving the corners of the substantially rectangularly shaped enlarged end of the tube, said frame defining a first opening for exposure of the viewing screen of the tube and a second opening spaced from the first opening for access from the front of said frame to the associated electrical components; adjustable bracket means between the protrusions of said frame and the corners of the enlarged end of the tube; cushion elements positioned between said bracket means and the corners of the enlarged end of the tube; means extending from the integral protrusions of said frame for securing the bracket means; whereby the cathode ray tube may be frictionally restrained in a fixed position within the protrusions of said rigid frame with a minimum of space utilized; a pair of panels extending rearwardly from said frame spaced from the axis of the cathode ray tube; a rear panel connected between said first mentioned pair of panels; a movable circuit board for mounting electrical components associated with the cathode ray tube and received through the second opening of said frame; guide means for supporting said circuit board, said guide means having a first member in stationary position relative to said frame and said panels, and a second member on said circuit board, the first and second members being adapted to mate with each other; and means for electrically connecting stationary electrical components associated with the cathode ray tube to a portion of the electrical components on said movable circuit board when said movable circuit board is supported by said guide means; whereby the panels partially enclose the tube and associated electrical components, and the movable circuit board may be easily withdrawn through the second opening and on the first member of said guide means to permit adjustment and maintenance to electrical components on said circuit board while connected to the stationary electrical components.

5. In a television receiver apparatus, a rigid rectangular support frame having outermost opposite edge portions and an opening between said edge portions for exposure of a substantially rectangularly shaped viewing screen of the picture tube of said receiver apparatus, said frame having a plurality of protrusions shaped for receiving the corners of the enlarged end of the picture tube; a plurality of adjustable bracket means each of which is associated with a different one of said protrusions, each of said bracket means having one portion between said associated protrusion and said corner of the enlarged end of said picture tube; and cushioning means to abut the corners of the enlarged end of the picture tube and positioned between the corners of the enlarged end and said bracket means so that portions of the periphery of the picture tube defining said viewing screen are substantially flush with said outermost opposite edge portions of said support frame whereby the picture tube may be frictionally restrained at the corners thereof by said cushioning means in a fixed position in the protrusions of said support frame while at the same time minimizing the frontal space utilized by said receiver apparatus.

6. In the television receiver apparatus as defined in claim 5, the protrusions of said frame having holes disposed toward the first opening; and the adjustable bracket means being screw-threadedly engaged within said holes so that force components exerted upon the corners of the picture tube relative to said frame and through said cushion elements urge the tube toward the periphery of the frame adjacent the opening.

* * * * *